Feb. 19, 1935. A. CROFT 1,991,545
JOINTING OR COUPLING DEVICE FOR FLEXIBLE DRIVING BELTS
Filed Dec. 4, 1933 2 Sheets-Sheet 1
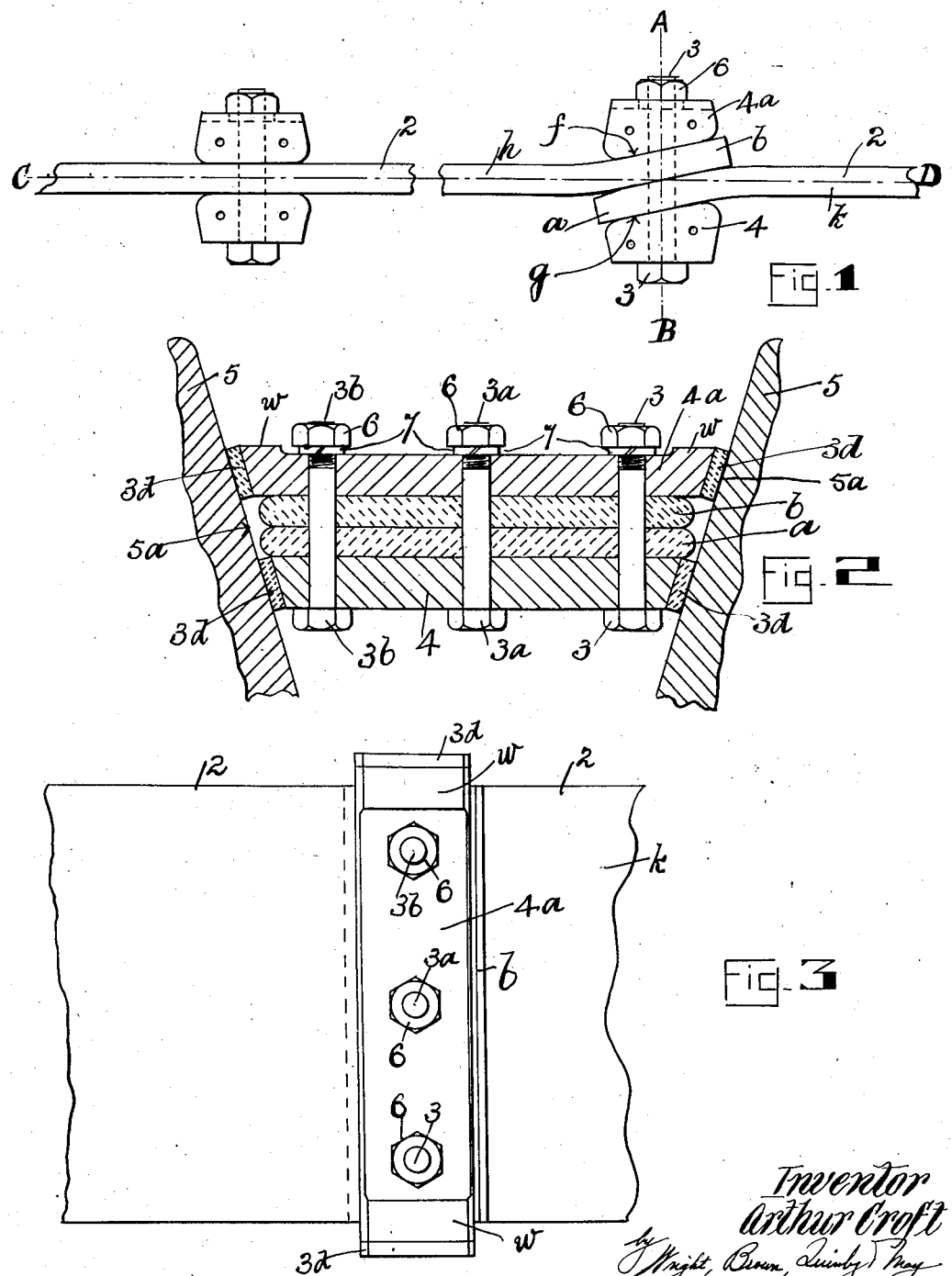

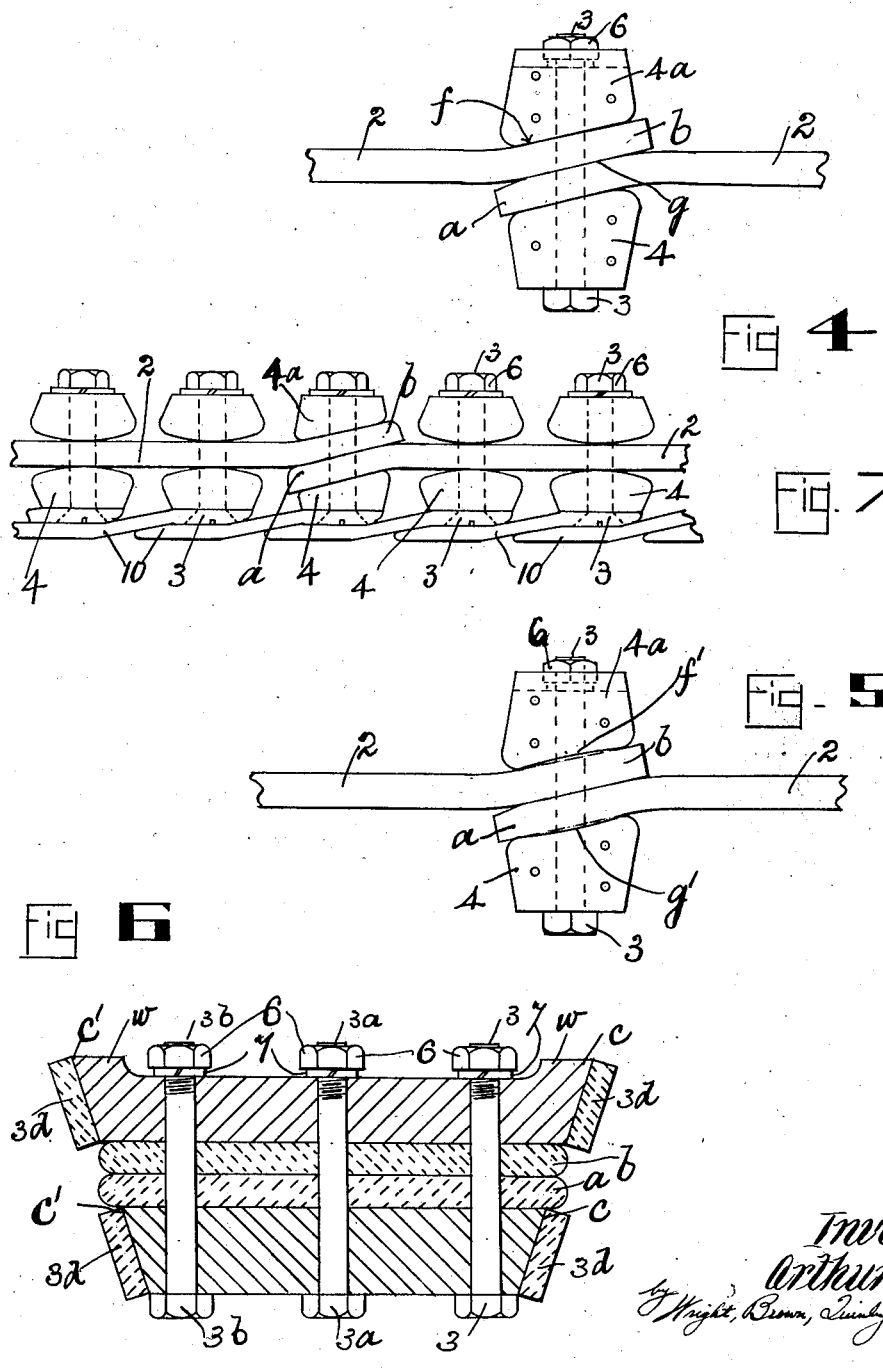

Patented Feb. 19, 1935

1,991,545

UNITED STATES PATENT OFFICE 1,991,545

JOINTING OR COUPLING DEVICE FOR FLEXIBLE DRIVING BELTS

Arthur Croft, Rawdon, near Leeds, England

Application December 4, 1933, Serial No. 700,796
In Great Britain April 26, 1933

6 Claims. (Cl. 24—37)

This invention relates to jointing or coupling devices for flexible driving belts (which may be of leather, woven fabric, India rubber impregnated material or other material) which are provided with thrust-resisting bars of metal, wood or the like which are fixed crosswise upon them to withstand end pressure that is put upon them when the belts are used in connection with driving pulleys having V-shaped grooves against the inclined surfaces of which the correspondingly inclined ends of the bars are forced in known manner, especially when said pulleys are of the type which are adjustable upon their shafts to transmit, by their actions, power at variable speeds. In the use of belts of the type described disadvantages have been found in the production of means for coupling or securing one end of the belt to the other in a manner that would render same sufficiently resistant as would enable it to withstand the strains, stresses and twisting actions of the jointed parts when moving from the curved to the straight, and from the straight to the curved paths in which they have to travel.

My present invention consists in the production of thrust-resisting bars arranged in pairs and the fixing screws and parts in connection therewith, of such a character as will enable them to act as the coupling or joint forming members as well as to perform their usual functions of thrust resistance by reason of their actions hereinafter explained.

In order that my said invention may be more readily understood, I have hereunto appended sheets of drawings to which by figures and letters reference is made in the following description:—

Fig. 1 is an edge view of a belt having its two outer ends coupled together by my improved cross bar devices, and the fixing means in connection therewith, as is hereinafter explained.

Fig. 2 is a sectional end elevation of the devices shown by Fig. 1, the same being taken on line AB of said figure and as seen looking from right to left thereof.

Figure 3 is a plan of the parts shown by Fig. 2.

Fig. 4 is a similar view to Fig. 1, but illustrates the formation of the cross, thrust-resisting bars of larger cross sectional area than are those shown by Fig. 1.

Fig. 5 is a similar view to Fig. 4, but shows the cross thrust resisting bars of a modified formation hereinafter explained.

Fig. 6 is a cross sectional view similar to Fig. 2, but showing the devices formed in accordance with the elevation shown by Fig. 4.

Fig. 7 illustrates a form of belt that might also have its outer ends coupled together by my improved devices hereinafter fully explained.

In carrying my invention into effect I arrange the ends $a$ and $b$ (of the endless belt 2 that are to be coupled to each other) to overlap, as is shown by Fig. 1, so that the overlapping part $b$ of one end may extend over the end $a$ of the other part to permit binding bolts or screws 3, 3$a$ and 3$b$ to pass through both of the end parts $a$ and $b$.

On the outer surface of each of the parts $b$ and $a$, (that is the upper surface of the part $b$ and the lower surface of the part $a$) I mount a thrust-resisting bar 4$a$, 4 having each of its outer ends $c$ and $c^1$ inclined in the known manner to fit with its inclined surfaces 3$d$ against the inclined surfaces 5$a$ of the flanges 5 which form the V-shaped groove of the pulley in known manner.

The surfaces $f$ and $g$ of the respective bars 4$a$ and 4 (each of which has to fit and be forced firmly into contact with the outer surfaces of the ends $a$ and $b$ of the belt 2) I form according to my invention so that each of them is at an angle other than a right angle to the axes of the fixing bolts 3, 3$a$ and 3$b$ when same are mounted and firmly screwed into position to force said bars 4$a$ and 4 to grip the said ends $b$ and $a$ of the belt 2 between them. This angularity of the surfaces $f$ and $g$ of the thrust-resisting bars 4$a$ and 4 is determined by arranging the body parts $h$ and $k$ of the belt 2, which extend in opposite direction from the fixing bolts 3, so that a central longitudinal line, indicated by the chain line C and D, will pass through the centre of the bolt 3 and through the centre of the plane in which the straight portions $h$ and $k$ of the ends of the belt 2 lie, and will be at an angle to the axis of the bolts 3$a$ and 3$b$ as is shown by Fig. 1, in order that when said bolts are inserted through said openings, the axes of the bolts will be at right angles to the plane in which the line CD taking through the central plane of the belt parts $h$ and $k$ is situated, as is shown by Fig. 1.

On account of the thrust-resisting bars 4 and 4$a$ being made to occupy the said positions which are situated relatively to the angularity of the bolts 3, when the nuts 6 on said bolts 3 are tightened up, the inclined face $f$ and $g$ on the bars 4$a$ and 4 will force the ends $a$ and $b$ of the belt 2 which have to be joined together into such firm contact with each other as to secure same as desired.

The fixing bolts 3, 3$a$ and 3$b$ are of a diameter to snugly fit within the openings made for them through the bars 4 and 4$a$, as well as through the ends $a$ and $b$ of the belt 2, in order to enable the tendency of the tilting actions of the bars 4 and 4$a$ to be in directions which force their outer edges to grip the end portions $a$ and $b$ of the belt 2 between them. Thus by the gripping actions of the said thrust-resisting bars throughout the whole width of the belt, the dragging or pulling tension put upon the belt does not rely entirely upon the strength of the parts of same between the ends of the belt and the centres of the bolts as is the case when the angularity of the surfaces described is not made use of.

As is shown by Figs. 1 and 4, the inclined surfaces $f$ and $g$ of the thrust-resisting bars 4 and 4a are straight and even throughout. However, it may be desirable, under certain conditions, to have the said surfaces slightly concave in formation as is shown at $f^1$ and $g^1$ by Fig. 5, in which case the pressing of the surfaces $f^1$ against the end $b$ of the belt may cause the middle part to be forced into the crowded or thickened formation to fill the concave surface of the bar 4a as well as will the surface of the belt $a$ fill the concave part of the bar 4, also as shown by Fig. 5, in which case greater gripping action of the bars 4 and 4a is exercised over the ends of the belts $a$ and $b$, and consequently fortify same to withstand any dragging or pulling strains put upon them by the belt 2.

As is known the ends $c$, $c^1$ of the bars 4 and 4a upon which the friction generating members 3d are fixed, are of sufficient area in each case as occasion may require, in order that the friction caused by them when forced against the inclined surface 5a of the flanges 5 as shown by Fig. 2, may be sufficient to meet the requirements under the well known conditions.

When it is found necessary for the ends of the bars 4 and 4a to be increased in area beyond that of their ordinary cross-sections, the ribs or enlargements $w$ may be formed upon them as shown by Figs. 2, 3 and 6.

As means for preventing the nuts 6 on the bolts 3, 3a and 3b from becoming loose when in use, I mount a spring washer 7 on each bolt, so that the recoiling actions of same will prevent rotation on the part of the nuts 6 in known manner.

It is obvious that I may make use of the joint forming cross bars as is hereinbefore described in connection with belts which only require the fixing of the series of cross bars on one side of same, as is shown by Fig. 7, since in this case the ends of the belts 2 in connection with the belt 10 which is of the laminated character well known, might, with equal facilities, be connected together by my thrust-resisting bars having inclined gripping surfaces as is hereinbefore fully explained.

The belt 2 with the laminated belt 10 (or an ordinary flat belt may be used) secured to the surfaces of the cross-bars 4 as shown by Fig. 7, may be made use of when the driving or driven pulley (which it has to rotate) has a flat surface for the contacting of the belt 10, while the other (driven or driving) pulley is of the V-grooved type which has its surfaces for contact with the inclined ends of the bars 4 and 4a.

It will be seen that my invention constituting a coupling for the lapped ends $a$ and $b$ of a flexible driving belt, comprises cross bars 4 and 4a having clamping inner surfaces $f$ and $g$ bearing on opposite sides of said lapped ends and inclined so that they are non-parallel with, or inclined relative to, a straight portion (indicated by the line CD) of the path in which the belt travels, or in other words to a straight stretch of the belt, and means for exerting clamping pressure on said cross bars, the preferred means being the binding bolts having heads 3 and clamping nuts 6. The outer surfaces of said cross bars are substantially at right angles to the inner faces of the nuts 6, so that the clamping belts maintain the clamping inner surfaces $f$ and $g$ inclined relative to a straight stretch of the belt, and maintain a similar inclination of the lapped ends $a$ and $b$.

Such being the nature and object of my invention, what I claim is:—

1. A coupling for the lapped ends of a flexible driving belt, comprising clamping cross bars bearing on opposite sides of said lapped ends, and having clamping surfaces at angles to a straight portion of the path in which the belt travels, and binding bolts taking through said cross bars substantially at right angles to said path.

2. A coupling for the lapped ends of a flexible driving belt, comprising clamping cross bars bearing on opposite sides of said lapped ends, and having clamping surfaces at angles to a straight portion of the path in which the belt travels, and binding bolts which secure said bars in their predetermined positions by fitting snugly within openings in said cross bars.

3. A coupling for the lapped ends of a flexible driving belt, comprising clamping cross bars bearing on opposite sides of said lapped ends, and having clamping surfaces at angles to a straight portion of the path in which the belt travels, binding bolts provided with clamping nuts, and securing said bars in predetermined positions, and spring washers preventing rotation of the nuts of said bolts.

4. Coupling devices for jointing or securing the ends of flexible belts to each other, comprising cross bars having their contacting surfaces at angles to the straight parts of the paths in which their belts travel, fixing means for securing said cross bars upon said belts, and means whereby an additional belt surface may be secured to one series of the cross bars to enable same to operate in conjunction with a flat surfaced pulley as well as a V-shaped grooved pulley as herein set forth.

5. A coupling for the lapped ends of a flexible driving belt, comprising cross bars having clamping inner surfaces bearing on opposite sides of said lapped ends, and inclined relative to a straight stretch of the belt, and means for exerting clamping pressure on said cross bars, means being provided for maintaining said clamping surfaces inclined relative to a straight stretch of the belt, and mantaining a similar inclination of said lapped ends.

6. A coupling for the lapped ends of a flexible driving belt, comprising cross bars having clamping inner surfaces bearing on opposite sides of said lapped ends, and inclined relative to a straight stretch of the belt, said cross bars having outer surfaces substantially parallel with a straight stretch of the belt, and binding bolts closely fitting bolt holes extending through the cross bars, and having heads bearing on the outer surface of one cross bar, and clamping nuts bearing on the outer surface of the other cross bar, said bolts exerting clamping pressure on the cross bars and cooperating with the outer surfaces of said bars in maintaining said clamping surfaces inclined relative to a straight stretch of the belt and maintaining a similar inclination of said lapped ends.

ARTHUR CROFT.